Dec. 22, 1936.　　E. G. STRECKFUSS　　2,065,353
AGITATING MACHINE
Filed Jan. 15, 1934　　2 Sheets-Sheet 1

INVENTOR.
Elmer G. Streckfuss
BY
Allen & Allen
ATTORNEYS.

Dec. 22, 1936.  E. G. STRECKFUSS  2,065,353

AGITATING MACHINE

Filed Jan. 15, 1934  2 Sheets-Sheet 2

INVENTOR.
Elmer G. Streckfuss
BY
Allen & Allen
ATTORNEYS.

Patented Dec. 22, 1936

2,065,353

UNITED STATES PATENT OFFICE 2,065,353

AGITATING MACHINE

Elmer G. Streckfuss, Cincinnati, Ohio, assignor to The Cincinnati Time Recorder Company, Cincinnati, Ohio, a corporation of Ohio Application January 15, 1934, Serial No. 706,678

4 Claims. (Cl. 259—88)

My invention relates to machines for agitating liquids or semi-liquids, and more especially to such machines for operating upon such substances by a combined agitating and centrifugal action. Instances of operations of this character are mixing, whipping, beating, separating, churning and the like. Machines for effecting such results have been used, in which a stationary container was provided interiorly with some kind of rotating or otherwise moving agitator; and when the agitator was rotary, a centrifugal action was afforded, accompanied, either expressly or incidentally, by an areating action. The most familiar examples of such machines in the prior art are relatively small machines for culinary uses, or for churning or separating butter from milk or cream. My invention is peculiarly adaptable in that field of use.

An object of my invention is to attain a more thoroughly distributed agitating action throughout the body of substance being treated, than has heretofore been attained by the use of machines of the character above mentioned.

A further object is to provide a machine embodying the novel principles of my invention, for the attainment of the above mentioned object, which is extremely simple and inexpensive, in manufacture, storage and shipping, and in operation.

A further object is to provide such a machine of a construction adapting it for operation in a variety of ways, according to the nature of the materials and the treatments to be given them, by simple changes or interchange of parts, in conformity with the object of simplicity and inexpensiveness.

A further object is to provide such a machine of construction permitting its parts to be readily disassembled for cleaning, and in general to provide for thorough sanitation as is necessary in a machine for operating upon articles of food or other products, the purity of which is essential.

In principle, my invention differs from prior devices of the character above mentioned, in the rotation of the container relatively to the agitator at such a speed that the container surfaces set up a substantial centrifugal action on the contents, causing a centrifugal flow thereof so that all portions of the contents are successively subjected to the greatest movement relative to the agitator. This affords a distribution of the agitating action, and also an effective areating action, to every particle of the contents more thorough than is afforded by using a stationary container, and relying upon the movement of the agitator for movement of the portions of the contents successively into the zones of most efficient action.

Objects other than those above mentioned will appear in the course of the following description, illustrated by the accompanying drawings, in which—

Figure 3:
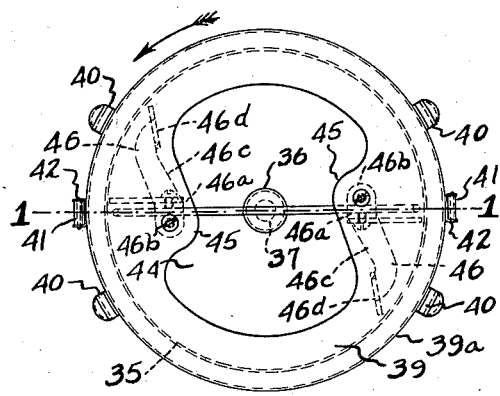
Figure 3 is a plan view of the container with its cover thereon.
Figure 2:
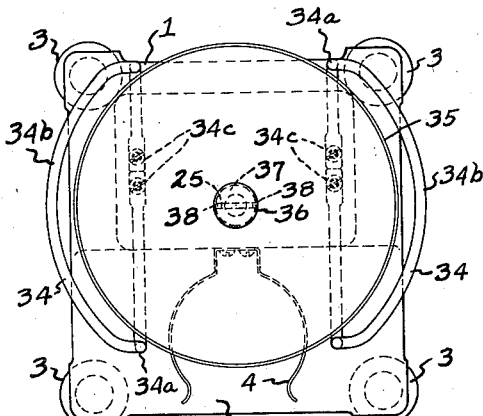
Figure 2 is a plan view of the machine with the cover removed.

The machine which I have illustrated as one embodiment of my invention comprises, as shown in all of the examples, a casing 1 with a base having a rear extension 2 at one side and provided with feet 3, preferably of rubber or the like, to afford a firm support on any fairly level surface. A resilient clip 4 is mounted on the casing 1 and extends out over the extension 2, to grip and hold a vessel standing on the extension 2.

At the front the base and casing have a wide recess 5, and above this the casing has an opening 6, opposite which rear and front aligned bearings 7 and 8 are formed, respectively, in the opposite wall of the casing and in a member extending across the casing from one lateral wall to the other. A plate 9 closes the opening 6. A shaft 10 is journaled in these bearings 7 and 8, and between them has a bevel gear 11 pinned on it. The opening 6 admits these parts when assembling, before it is closed by the plate 9. To prevent substantial end play of the shaft 10, it has a groove 12 around it at the front of the front bearing 8, and a strip 13 is screwed to the bottom of the bearing member 8 and bends up therearound with its end in the groove 12.

Figure 9:
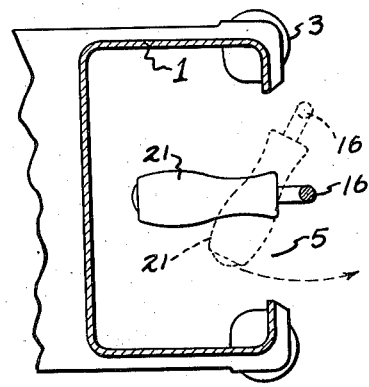
Figure 9 is a horizontal section on the line 9—9 of Figure 7.
Figure 6:
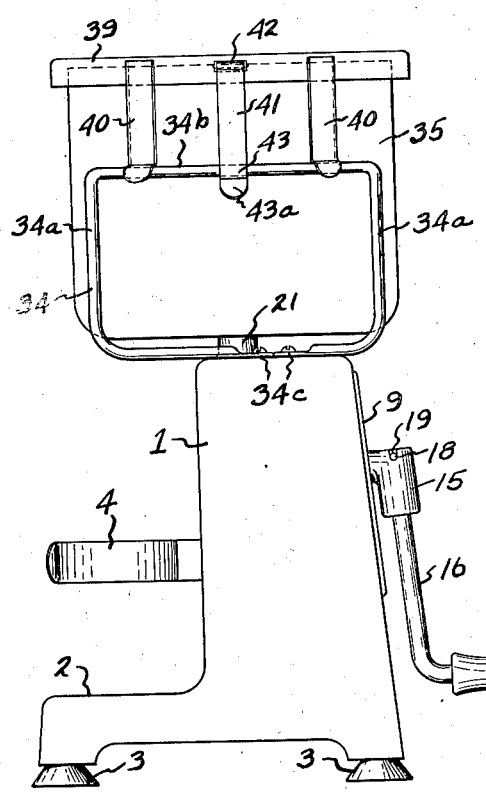
Figure 6 is a side elevation of the machine shown in Figure 1.
Figure 7:
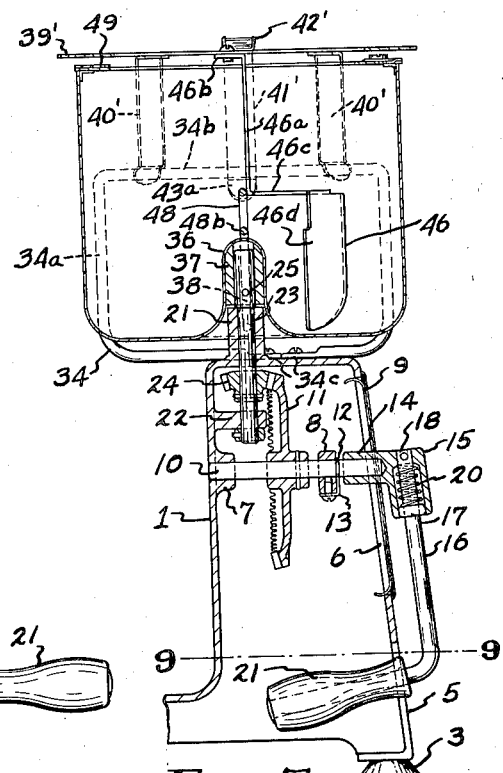
Figure 7 is a vertical section corresponding to that of the line 7—7 in Figure 1, but showing certain modifications of the bowl cover construction.

The shaft 10 extends forwardly and has fixed on its front end a hub member 14 with a front barrel portion 15 radial thereto, fully open at its outer end and having a smaller opening at its inner end. A crank member 16 projects from the outer end of this barrel portion 15, having a collar 17 fixed on it snugly, but slidably fitting this outer end; and the inner end of the crank member 16 similarly fits in the smaller opening, and has a pin 18 through it to enter slots 19 in the end of the barrel portion when the crank member 16 is forced outwardly of this barrel portion by a helical spring 20 compressed between the collar 17 and the opposite end of the barrel portion. The recess 5 is wide enough, as best seen in Figure 9, to permit the crank member 16 to swing its handle portion 21 into the casing, as seen in Figure 7, or out of it, as seen in Figure 6, when the crank member 16 is pressed radially inwardly, removing its pin 18 from the slots 19. The spring 20 will reseat the pin in the slots when the crank member comes to either of these positions in one of which the machine is made more compact for packing, and in the other of which the crank is available for turning the shaft 10 and the gear 11 thereon.

The top of the casing has an upstanding hub 21, and below this, projecting in from its rear wall, a lug 22. The hub and lug have vertically aligned bearings for a spindle 23 having pinned on it between these bearings a bevel pinion 24 meshing with the bevel gear 11. This spindle 23 projects above the hub 21, where it is enlarged, forming a shoulder to seat on top of the hub, limiting downward end play of the spindle; and this enlarged upper projection has a pin 25 projecting at both sides.

Figure 4:
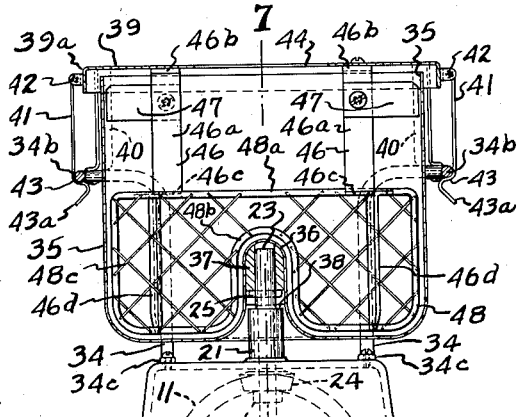
Figure 4 is a plan view of a fruit juicer device interchangeable with the agitating device on my machine.
Figure 4:
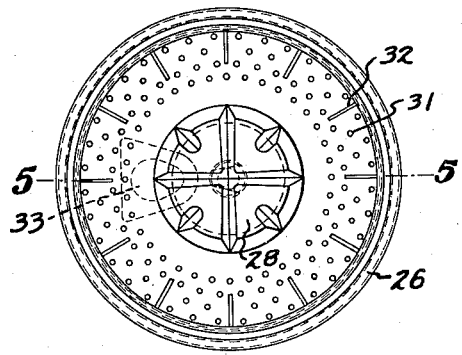
Figure 1:
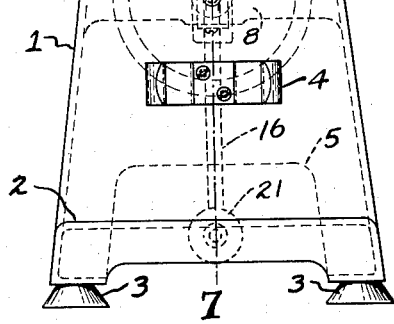
Figure 1 is a front elevation of a machine embodying my invention, the container and its cover being in vertical section on the line 1—1 of Figure 3.
Figure 5:
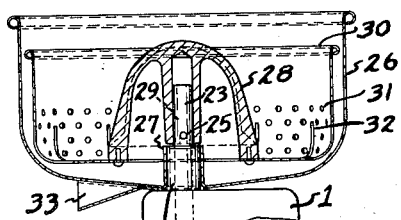
Figure 5 is a vertical section of the same on the line 5—5 of Figure 4.

The assemblage just described forms a driving unit for any one of different devices which may be connected to the spindle 23. One device that may be so connected is shown in Figures 4 and 5, being a fruit juice extracting device of construction and operation fully disclosed and claimed in the patent to Jack W. Puterbaugh, No. 1,550,844, issued August 25, 1925, the present example being modified therefrom only as to certain details adapting it for use with the driving unit above described. A bowl 26 has the central part of its bottom formed upward into a hub 27 to fit tightly on the upstanding hub 21 of the casing 1, holding the bowl stationary. A reamer 28 has a hub embracing the upper extension of the spindle 23, with keyways 29 receiving the projections of the pin 25 thereof, so that the reamer turns with the spindle 23. A strainer 30 of cup shape has a large central aperture in its bottom, the edges of which are fixed to the bottom edge of the skirt of the reamer 28, so that it rotates with the reamer. This strainer has perforations 31 and slots 32 in its peripheral walls and in its bottom out next to said walls. The action, as in the prior device of the patent mentioned above, is to ream the fruit pressed down on the reamer 28, freeing its juice, which is thrown out centrifugally by the rapidly rotating strainer 30, to pass through the perforations and slots into the bowl 26, leaving the pulp, seeds and the like in the strainer. A spout 33 in the bottom of the bowl allows escape of the juice, and the bowl may be turned on the casing hub 21 so that this spout is over the base extension 2, to discharge into a vessel held thereon as before described.

The other device exemplified as being attachable to the driving unit, embodies the novel principle before mentioned, of centrifugal action of the container for substances that are to be mixed, beaten, whipped, churned or similarly operated upon. Two examples are shown, not differing in principle but in certain details of cover arrangement. The first example is shown in Figures 1, 2, 3 and 6; the second in Figures 7 and 8. Both are alike in that a pair of inversely presented support frames 34 are mounted on the top of the casing 1, each being in the form of a heavy wire bent into a rectangle, and this rectangle bent near one side to form a longer lower vertical part 34a and a shorter top outwardly extending horizontal part 34b, which is bowed outward in an arc concentric with the spindle 23 when the ends of the wire at the bottom of the formation, flattened as at 34c, are screwed to the top of the casing 1. These frames 34 thus formed and mounted are so disposed as to allow the juice extracting device, just before described, to be mounted and operated on the driving unit.

In the example of Figures 1, 2, 3 and 6, a container 35 of generally cylindrical shape with open top, has the central part of its bottom upwardly distended to form a hub portion 36 in which is secured a bushing 37 that fits snugly on the upward extension of the spindle 23, with keyways 38 receiving the extensions of the pin 25 thereof, the same as the reamer 28 of the juice extracting device. The distension or hub portion 36 preferably is deep enough for the container to have its bottom close to the top of the casing 1 when the hub bushing 37 rests against the top of the upstanding hub 21 of the casing. By this mounting the container 25 may be rotated with the spindle 23, the same as the reamer and strainer of the juice extracting device, the curved frame parts 34b lying only a short distance outward from the container sides.

The cover 39 for the container 35, as shown in this example, is of shallow inverted pan shape to lie slightly above the top rim of the container with its peripheral wall 39a lapping down past this rim and spaced slightly outward therefrom. Fixed to and depending from this cover wall 39a are four legs 40, having their lower end parts bent radially outward and then curved downward, so as to fit snugly on the arc shaped parts 34b of the frames 34 and firmly support the cover 39 when clamp members 41, hinged at 42 to the cover wall 39a at diametrically opposite sides thereof, are swung down and snap their inwardly curved lower parts 43 under the middle portions of the arc shaped frame parts 34b. These inwardly curved lower parts 43 have their end parts curved outward to form tongues 43a engageable by the fingers for applying and disengaging the clamp members. By these means, the cover 39 is firmly held against rotation on the casing 1.

This cover 39 preferably has a large aperture 44 in its top for inspection of the contents of the device while it is operating; but at opposite sides of this aperture 44, there are inward extensions 45 to which are fixed the upper ends of the respective brake members 46, which depend into the container. Each brake member 46 preferably comprises a flat strip bent with an upper vertical portion 46a, the upper end part 46b of which is bent at right angles for screwing the member to the cover; a middle horizontal portion 46c bent to extend along and toward the peripheral wall of the container 35; and a lower vertical blade portion 46d which is of considerable width, with its outer edge very close to and conforming to the shape of the container wall from the junction of the wall with the bottom up to about half the height of the container. This blade portion 46d has its width disposed at an acute angle to the container wall, and the two brake members 46 are disposed so that both of them have these blade portions 46d inclined to said wall in the same direction relative to a given direction of rotation of the container 35. Preferably, this direction is such that the wall areas approach these blade portions 46d at their obtuse-angle sides, or in the direction of the arrow in Figure 3.

The result of this arrangement is to throw the liquid or semi-liquid contents of the container upward, due to its contact with the container walls, imparting the centrifugal action, and its contact with the blade portions 46d, tending to stop the circular motion, departure from which is freer in upward direction, out of the body of contents. After its rise, the substance flows downward and inward, and again begins an outward travel, with repeated action of this character upon every particle of the substance. This is more effective than centrifugal action derived from a member rotated in a stationary container, because the entire container wall area contacting with the substance is active centrifugally, whereas the usual rotated member has a relatively limited area in contact with the contained substance, and also does not have the radius, which is an important factor in centrifugal action, proportionate to the size of the apparatus and volume of substance, that is had by the container walls. It will be understood that the bottom of the container also imparts a minor proportion of the centrifugal action.

Due to the efficiency of my improved apparatus for acting centrifugally on the substances, provision usually is necessary for preventing flow of the upwardly thrown substances out over the rim of the rotating container 35. This provision is made preferably as most clearly shown in Figures 1 and 3. Fixed to the upper vertical portions 46a of the respective brake members 46, preferably by screws as shown, are scrapers or wipers 47, extending outward and contacting their outer ends with the container wall up near the top rim thereof. These members 47 preferably are of rubber or similar material, adapted to effectively wipe or scrape the walls, yet not to scratch or mar them or catch therein so as to be torn from their mountings. When the substance rises from the blade portions 46d as before described, far enough to contact these scrapers or wipers 47, its circular motion and centrifugal momentum are arrested, so that it loses its relation to the container walls by which it is being impelled, and gravity acts to return the substance downward into the space at the center of the container, where there is a diminished depth of the substance due to the centrifugal action. The cover 39, lying over the container rim and with its wall 39a lapping down at the side thereof, effectively arrests any of the substance splashing thereover due to the action of the wipers 47, or in the extent of rim between wipers.

An added agitating means is provided, the use of which is optional. It comprises a grid like structure 48 extending entirely across the interior of the container and held stationary along with the brake members 46. As here shown it is made up of a heavy wire frame 48a, the middle bottom part 48b of which is curved upward over the hub distension 36 of the container bottom, and light wires 48c crossing at right angles and preferably diagonally of the frame, with their ends welded to the frame. This grid structure extends to about the same height as the blade portions 46d of the brake members 46, and its top transverse part is fixed, preferably by welding, to these brake members at the junctions of their horizontal portions 46c with their upper vertical portions 46a. It will be understood, however, that the grid may be suitably removably mounted.

Figure 8:
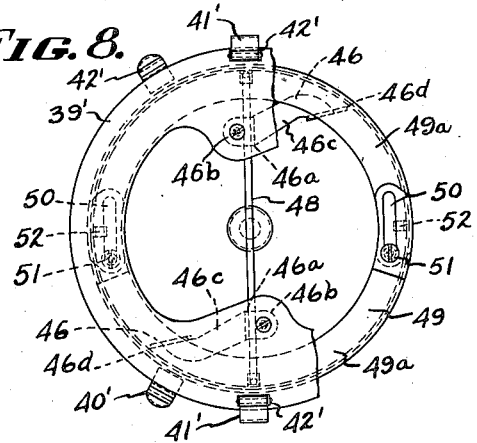
Figure 8 is a plan view of the bowl with the modified cover construction of Figure 7.

The example of Figures 7 and 8 is like that of Figures 1, 2, 3 and 6 just described, except as to details of the cover. Instead of having the cover provided with a depending wall lapping the container rim, the container 35' is provided with an inwardly projected ring 49, which is made detachable to admit the braking members 46 and the grid 48, also shown in this example. This preferably is provided for by making this ring 49 in two sections 49a with ends bent to interlap, one end of each having a slot 50 and the other end of each having a screw 51 through the respective slot of the other section. Each section, at its end having the screw 51, also has a depending lug 52 to engage the inner surface of the wall of the container 35' adjacent the rim thereof. By inserting the assemblage of these sections 49a and expanding them by movement of the screws 51 along the slots 50 until the lugs 52 tightly grip the container rim portions, and then tightening the screws 51, the ring 49 is rigidly held on the container.

The cover 39' in this example is like the cover 39 of the previous example, except that it does not have the depending wall 39a, being merely of disc shape as a support for the braking members 46, which are attached to it and formed and related to the container as fully described for the previous example; and its mounting on the frames 34 also is similar to the one in that example. The legs 40' are similar, except that they are bent in to attach to the under surface of the cover 39', and the clamp members 41' are bent in to connect to their hinges 42' on the upper surface of the cover 39'.

Examples of my invention attaining my objects as herein first set forth, are illustrated and described specifically, and the advantages are set forth in detail in connection with the descriptions of the various parts. However, it will be understood that other modifications of structure and use may occur, and that I am not limited to such precise disclosure, but what I claim as new and desire to secure by Letters Patent, is:

1. In a machine of the character described, a rotatable container with its interior wall surface centrifugally active on contents of the container, means to impede circular movement of the substance imparted by said wall surface, said container having an open top with an exposed rim, and means relatively to which the container rotates, close to the interior wall surface of the container, near said rim, to impede substance tending to pass out over said rim under the centrifugal action.

2. In a machine of the character described, a rotatable container relatively deep in proportion to its width with its interior wall surface centrifugally active on contents of the container, means confined substantially within the lower half of the depth of the container to impede circular movement of the substance imparted by said wall surface, said container having an open top with an exposed rim, and means relatively to which the container rotates, scraping the interior wall surface of the container, near said rim.

3. In a machine of the character described, a rotatable container relatively deep in proportion to its width with its interior wall surface centrifugally active on contents of the container, means confined substantially within the lower half of the depth of the container to impede circular movement of the substance imparted by said wall surface, said container having an open top with an exposed rim, means relatively to which the container rotates, close to the interior wall surface of the container, near said rim, to impede substance tending to pass out over said rim under the centrifugal action, and a cover over said rim, with a peripheral portion lapping down around the outside of said rim, impeding splashing of substance over said rim.

4. In a machine of the character described, a base member, driving means on the base member comprising a spindle at the top of the base member, a container mounted on said spindle to rotate therewith, frame means extending up from said base member at opposite sides of the container, a cover over the container, legs on the cover, resting on said frame means, and means for clamping the cover down on said frame means.

ELMER G. STRECKFUSS.